United States Patent [19]

Yamada

[11] Patent Number: 4,893,150

[45] Date of Patent: Jan. 9, 1990

[54] COPIER

[75] Inventor: Yoshikado Yamada, Nara, Japan

[73] Assignee: Sharp Kabushiki Kaisha, Osaka, Japan

[21] Appl. No.: 273,808

[22] Filed: Nov. 18, 1988

[30] Foreign Application Priority Data

Nov. 20, 1987 [JP] Japan ................................ 62-294378

[51] Int. Cl.[4] ................................................ G03B 27/00

[52] U.S. Cl. ........................................ 355/243; 355/317

[58] Field of Search ..................................... 355/55-57, 355/309, 317, 321, 243

[56] References Cited

U.S. PATENT DOCUMENTS 4,417,806 11/1983 Tani ...................................... 355/57

4,461,564 7/1984 Ikenoue .......................... 355/317 X 4,783,682 11/1988 Maehara ................................ 355/57

*Primary Examiner*—L. T. Hix

*Assistant Examiner*—D. Rutledge

*Attorney, Agent, or Firm*—Flehr, Hohbach, Test, Albritton & Herbert

[57] ABSTRACT

A copier is comprised not only of an optical scanner and a paper supplying mechanism for supplying a copy paper sheet to have an image transferred thereonto, but also of numerical keys for inputting displacement values measured during an adjustment mode of operation of the copier at two magnification values such as 200% and 50% between the position of a target image with respect to a scanned original document and the position of a copied image of the target image with respect to a copy paper sheet and a control system which calculates timing values for supplying a copy paper sheet with respect to the action of the optical scanner on the basis of measured values inputted through the numerical keys, and controls the driving of the paper supplying mechanism according to a timing based on the timing values stored in a memory device.

3 Claims, 4 Drawing Sheets

COPIER

BACKGROUND OF THE INVENTION

This invention relates to a copier which sets the timing for supplying a copy paper sheet with respect to the motion of its optical scanner on the basis of values of displacements between the position of a copied image with respect to the copy paper sheet and the position of a target image to be copied with respect to the scanned original document measured at two different values of copy magnification during an adjustment period.

When a copier with variable magnification is shipped or checked for maintenance, its paper supply timing is examined in order to correct the displacement between the position of a target image to be copied with respect to the scanned document and the position of the copied image with respect to the copy paper sheet. This correction is conventionally effected by measuring the positions of copied images produced at two different values of magnification as well as the position of the target image which was copied and by determining the value of correction to be made from these measured values. In prior art systems, correction is usually determined either by using these measured values in an equation relating the timing for supplying a copy paper sheet to the displacement between the position of a target image with respect to the scanned original document and the position of the copied image with respect to the copy paper sheet or by consulting a preliminarily prepared table based on the aforementioned equation. Prior art systems relying on such methods are not convenient because calculations are complicated and errors can be easily caused. If the numerical table is too complicated, the operator can easily misread the entries. Moreover, it may require the service of a trained or experienced operator to perform the required adjustments.

SUMMARY OF THE INVENTION

It is therefore an object of the present invention to provide a copier of which the timing for supplying copy paper sheets can be adjusted without complicated calculations or a numerical table.

The above and other objects of the present invention can be achieved by providing a copier comprised not only of an optical scanner and paper supplying means for supplying a copy paper sheet to have an image transferred thereonto but also of input means such as numerical keys for inputting displacement values measured during an adjustment mode of operation of the copier at two different magnification values between the position of a target image with respect to a scanned original document and the position of a copied image of the target image with respect to a copy paper sheet, calculating and storing means for calculating timing values for supplying a copy paper sheet with respect to the action of the optical scanner on the basis of measured values inputted by the input means and storing the calculated timing values, and driving means for driving the paper supplying means according to a timing based on the timing values stored in the calculating and storing means.

With a copier thus structured, the timing for supplying copy paper sheets can be automatically set with respect to the operation of the optical scanner. Consequently, the adjustment of the timing and hence corrections of the displacement between the position of a target image to be copied with respect to the scanned original document and the position of the copied image with respect to the copy paper sheet can be effected easily, without necessitating the step of performing a complicated calculation or reading a fine numerical table. Instead, correction can be effected by directly inputting measured values into the control unit. Thus, the timing correction can be carried out accurately by anybody including those who are relatively inexperienced. Moreover, there is no additional tool or equipment for the correction, providing thereby an economical advantage.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DESCRIPTION OF A PREFERRED EMBODIMENT

Figure 1:
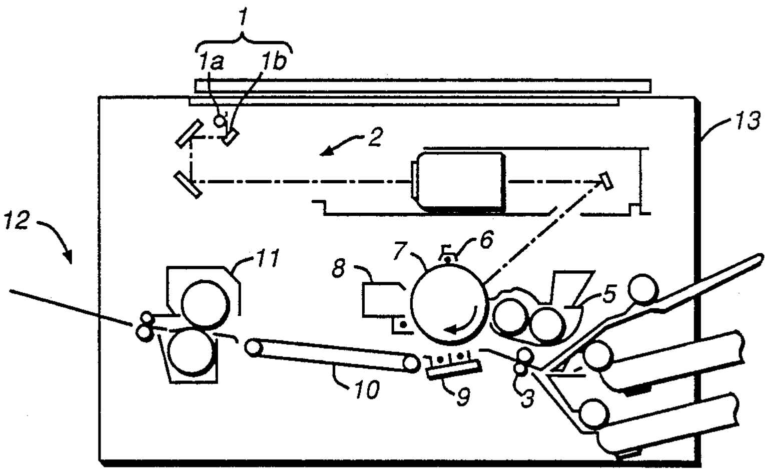
FIG. 1 is a schematic front sectional view of a copier embodying the present invention.

As shown schematically in FIG. 1, a copier according to a preferred embodiment of the present invention has a photoreceptor drum 7 disposed nearly at the center of its main housing structure 13. A primary charger 6, a developing device 5, a cleaning unit 8 and an image transfer-paper removal charger 9 are disposed around the photoreceptor drum 7. The upper part of the main housing structure 13 contains an optical unit 2 having an optical scanner 1 which includes a copy lamp 1*a*, a first mirror 1*b*, etc.

A paper supply unit 4 is provided below and on the opposite side of the developing device 5 away from the photoreceptor drum 7. Timing rollers 3 are disposed between this paper supply unit 4 and the photoreceptor drum 7 and serve to transport copy paper sheets to the photoreceptor drum 7. A copy paper sheet which has been transported by the timing rollers 3 to the bottom part of the photoreceptor drum 7 is subsequently transported from the bottom of the photoreceptor drum 7 to a fixing unit 11 by means of a paper conveyer device 10 and further from this fixing unit 11 to a discharge unit 12 to be discharged out of the housing structure 13.

The copying process executed by this copier is explained next with reference to FIG. 2 wherein numeral 30 generally indicates a control panel. When a print switch 33 provided on the control panel 30 is pressed, the optical scanner 1 of the optical unit 2 begins to move, scanning an original document to be copied which is placed on a document table, thereby projecting an image of the document onto the photoreceptor drum 7 and forming thereon a latent image corresponding to the image of the document. While toner is attached to this latent image by the developing device 5, a copy paper sheet is transported from the paper supply unit 4 to the timing rollers 3 and then the timing rollers 3 are operated at a predetermined timing to supply the copy paper sheet to the photoreceptor drum 7. The toner image formed on the photoreceptor drum 7 is transferred onto this supplied copy paper sheet by the operation of the image transfer-paper removal charger 9, which also serves to cause the copy paper sheet to separate from the surface of the photoreceptor drum 7. The toner image transferred onto the copy paper sheet is fixed by the fixing unit 11 and the copy paper sheet is thereafter transported to the discharge unit 12 and discharged out of the housing structure 13.

Figure 2:
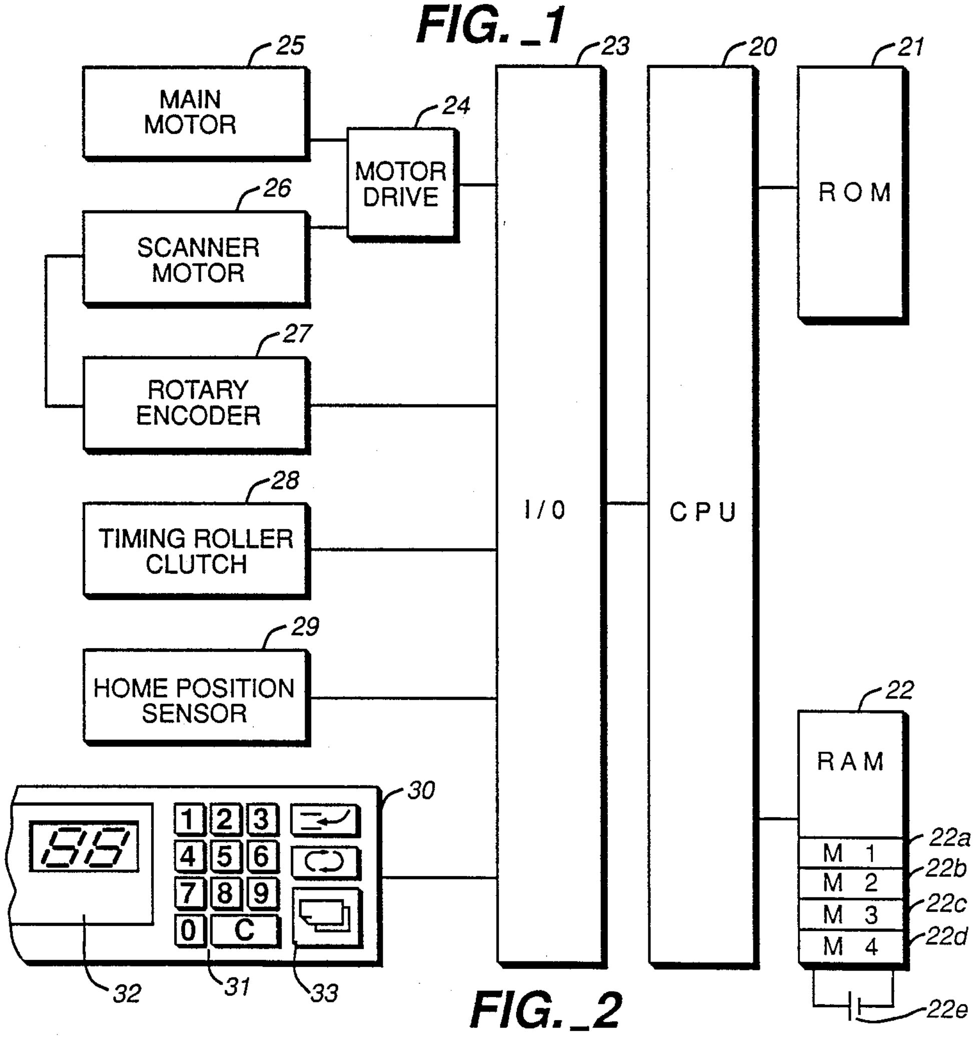
FIG. 2 is a block diagram of the control system of the copier of FIG. 1.

As shown in FIG. 2, a read-only memory (ROM) 21, a random-access memory (RAM) 22 and an I/O interface circuit (I/O) 23 are connected to a central processing unit (CPU) 20 of the copier. A main motor 25 for the copier and a scanner motor 26 for the optical unit 2 are connected to this I/O interface circuit 23 through a motor driving circuit 24. A rotary encoder 27 is connected to this scanner motor 26 for the optical unit 2 and the output from this rotary encoder 27 is received by the CPU 20 through the I/O interface circuit 23. Also connected to the CPU 20 through this I/O interface circuit 23 are a timing roller clutch 28, a home position sensor 29 and the aforementioned control panel 30. In addition to the aforementioned print switch 33, the control panel 30 is also provided with numerical keys 31 (to be used according to the present invention, for example, for specifying measured positions of a copied image with respect to the copy paper sheet, a target image with respect to the original document, etc.) and a display device 32.

The CPU 20 serves to control the overall operations of the copier as a whole and its control programs inclusive of calculation formulas to be described in detail below are preliminarily stored in the ROM 21. Memory areas (M1) *22a*, (M2) *22b*, (M3) *22c*, and (M4) *22d* individually for storing specified measured values, time, etc. as well as other working areas are assigned inside the RAM 22. These memory areas *22a*, *22b*, *22c* and *22d* are backed up by a battery *22e*. When the numerical keys 31 on the control panel 30 are operated and measured positions of a copied image with respect to the copy paper sheet and a target image with respect to the original document are inputted to the CPU 20 through the I/O interface circuit 23, the CPU 20 not only causes these inputted numerical values to be displayed on the display device 32 but also stores these values at the areas *22a* and *22b*. The CPU 20 further calculates a pulse number n and a time period tm to be explained below by using these inputted values and formulas in the ROM 21, storing these calculated values at the areas *22c* and *22d*. In the subsequent copying operation, the CPU 20 outputs signals to the motor driving circuit 24, the rotary encoder 27 and the timing roller clutch 28 on the basis of the stored pulse number n, time tm and an input signal from the home position sensor 29.

Figure 3A:
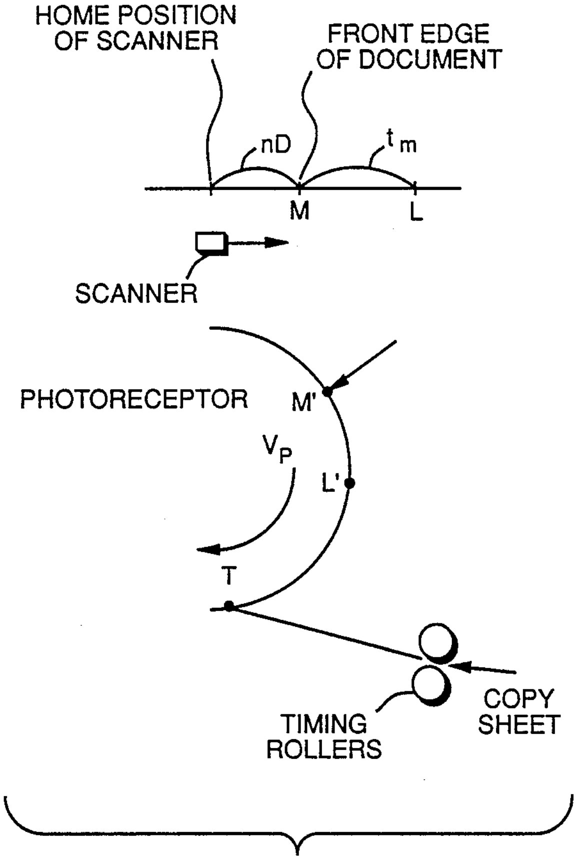
FIG. 3A is a drawing for explaining the relationship between the position of the optical scanner and the rotation of the photoreceptor drum and FIG. 3B is a flow chart for the control process of the timing rollers.

The relationship between the positional displacement of a document image and a copied image and the timing of supplying paper is explained next by way of FIG. 3A. The conceivable causes of positional displacements of a document image with respect to the document paper and of a copied image with respect to the copy paper sheet include errors in the positioning of the optical scanner and timing errors both in driving the motors and in the clutch operations for the timing rollers 3 which control the timing at which a copy paper sheet is transported.

Let us assume that the front edge of an original document to be copied is as a position away from the home position of the optical scanner 1 when the scanner motor 26 for the optical unit 2 is driven to move this optical scanner 1 such that the rotary encoder 27 attached to this motor will output a pulse number n. If the distance scanned by the optical scanner 1 per pulse is D, the distance between the home position of the optical scanner 1 and the front edge of the document is nD. Let us assume next that the exposure point on the photoreceptor by the optical scanner 1 is M' and that a toner image is transferred to a predetermined position on a copy paper sheet by switching on the clutch of the timing rollers $t_m$ seconds after the optical scanner 1 passes the position of the front edge of the original document. By this time, the exposed point on the photoreceptor drum 7 corresponding to the front edge of the original document has moved to a point indicated by L'. If the peripheral speed of the photoreceptor drum 7 is $V_p$, the displacement $\Delta L_{200}$ between the position of a copied image at magnification of 200% with respect to the copy paper sheet and the position of the document image with respect to the document sheet and the displacement $\Delta L_{50}$ between the position of a copied image at magnification of 50% with respect to the copy paper sheet and the position of the target image with respect to the document sheet are given by $$\Delta L_{200} = (nD/(100V_p/200) + t_m)V_p = 2nD + t_mV_p \quad (1)$$

and $$\Delta L_{50} = (nD/(100V_p/50) + t_m)V_p = 0.5nD + t_mV_p \quad (2)$$

From the above, $$n=(\Delta L_{200}-\Delta L_{50})/(2-0.5)D \quad (3)$$

and $$t_m=(2\Delta L_{50}0.5\Delta L_{200})/(2-0.5)V_p \text{ (sec)} \quad (4)$$

In order to match the starting point for exposure on the photoreceptor drum 7 corresponding to the front edge of an original document with the front edge of an incoming copy paper sheet, therefore, one must wait until the rotary encoder 27 of the scanner motor 26 of the optical unit 2 counts the pulse number n given by Equation (3) and still for an additional time period $t_m$ (sec) given by Equation (4) after the optical scanner 1 passes the set position of the home position sensor 29 and then turn on the clutch 28 of the timing rollers 3.

The pulse number n and the time period $t_m$ are calculated and stored during an adjustment mode of operation of the copier and these values are referenced in setting the timing for supplying copy paper sheets during a normal copying operation. With copy paper sheets supplied to the photoreceptor according to the timing thus set, copy images can be formed at correct positions on the copy paper sheets, corresponding to the position of the target image to be copied on the scanned document.

Figure 3B:
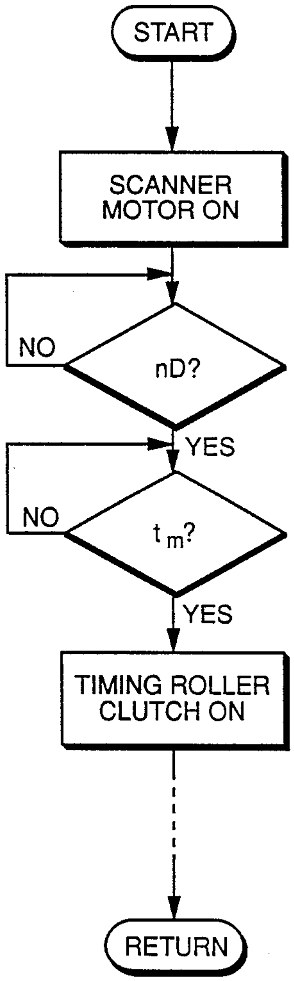

The process of controlling the timing rollers 3 according to the aforementioned timing is illustrated by a flow chart in FIG. 3B. When the print switch 33 is operated and the process is started, the optical scanner motor 26 is started first (n40) and the optical scanner 1 travels a distance of nD (n41) to reach the position (M in FIG. 3A) of the front edge of the original document to be copied. This position M corresponds to the exposure point M' on the photoreceptor and serves as the starting position for the exposure. After a time period of tm (n42), the optical scanner 1 is at a position indicated by L in FIG. 3A. The position of the starting point of exposure on the photoreceptor at this moment is indicated by L'. At this moment, the clutch 28 of the timing rollers 3 is activated (n43) and a copy paper sheet is supplied to the photoreceptor. The pulse number n and the time period $t_m$ are set such that the time required for a copy paper sheet to travel from the position of the timing rollers 3 to a point T on the photoreceptor where the transfer of a toner image commences will be the same as the time required for the photoreceptor to rotate from the angular position of L' to T. As a result, the starting point M' of exposure on the photoreceptor matches the front edge of the incoming copy paper sheet such that the toner image is transferred onto the copy paper sheet at a position exactly corresponding to the relative position of the original image with respect to the original document being copied.

Figure 4:
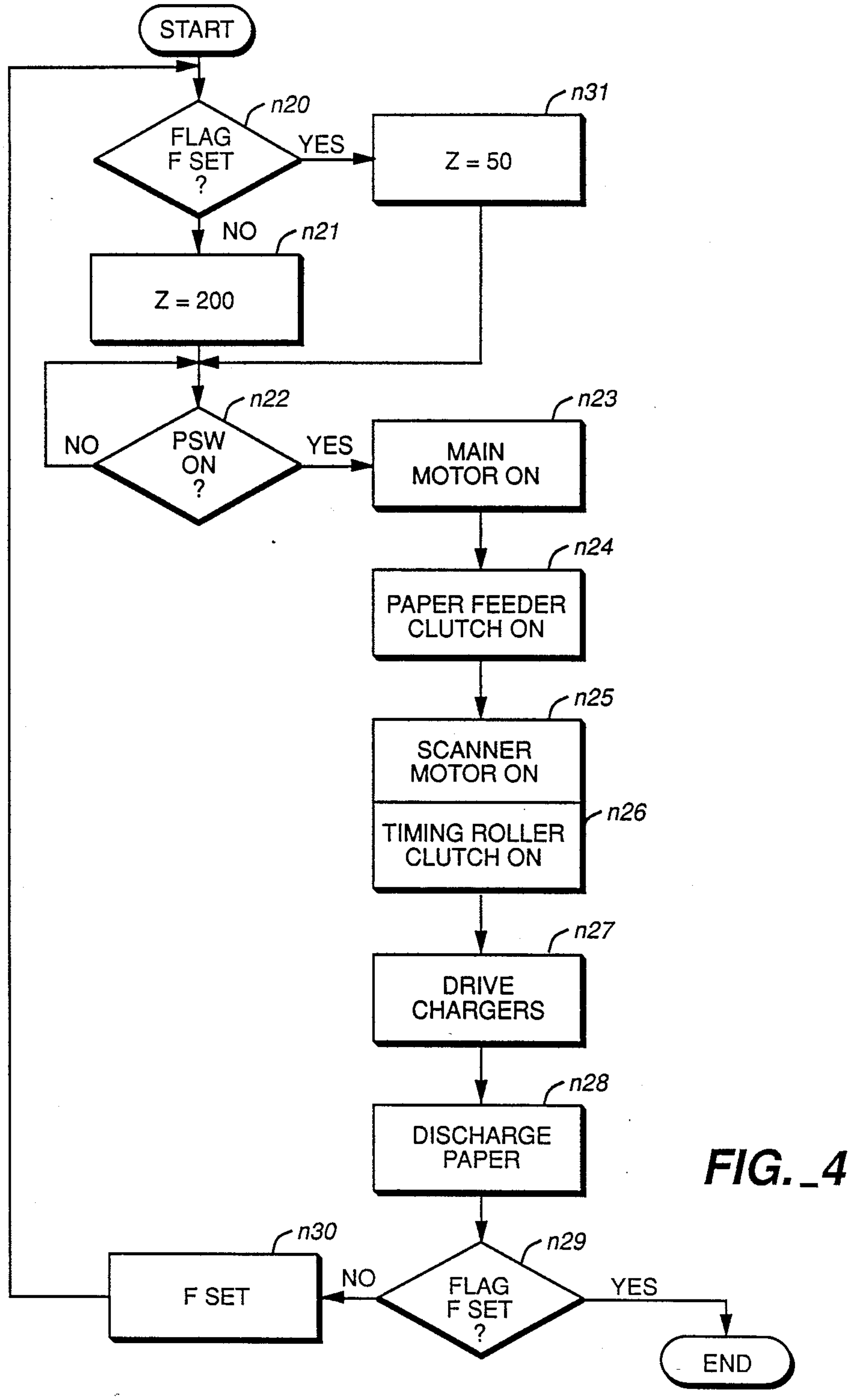
FIG. 4 is a flow chart of the normal copying operation of a copier embodying the present invention in its adjustment mode of operation.

With a copier embodying the present invention, magnitudes of the aforementioned displacements $\Delta L_{200}$ and $\Delta L_{50}$ between the position of a copied image with respect to the copy paper and that of the corresponding target image with respect to the original scanned document are measured by executing a copying process at two different magnifications. This process is explained next by way of the flow chart shown in FIG. 4.

As soon as power is switched on and the control is started, a flag F is reset, indicating that a copy is to be made at magnification (Z) of 200%. When a copy is to be made at magnification of 50%, this is indicated by this flag F being set.

In the first cycle of operation, since the flag F is reset (NO in n20), magnification is set to 200% (n21). When the print switch (PSW) 33 is operated thereafter (n22), the main motor is activated (n23) and the clutch for a paper feeder roller is connected (n24) to deliver a copy paper sheet to the position of the timing rollers 3. When the front edge of the delivered copy paper sheet reaches the position of the timing rollers 3, the scanner motor 26 of the optical unit 2 and the clutch 28 of the timing rollers 3 are switched on (n25 and n26) and the chargers 6 and 9, etc. are operated for specified periods of time (n27). After the copying process at this magnification is completed (n28), the flag F is examined (n29). Since the flag F is reset during the aforementioned first cycle of operation, it is set now (n30) and magnification is changed to 50% (YES in n20 and then n31). Thereafter, a second cycle of copying operation is executed (n22–n28) to produce a copy at magnification of 50%. The flag F being set now (YES in n29), the control program comes to an end. The operator now compares the two copy paper sheets with copied images at magnifications at 200% and 50% and measures the magnitudes of displacements $\Delta L_{200}$ and $\Delta L_{50}$.

Figure 5:
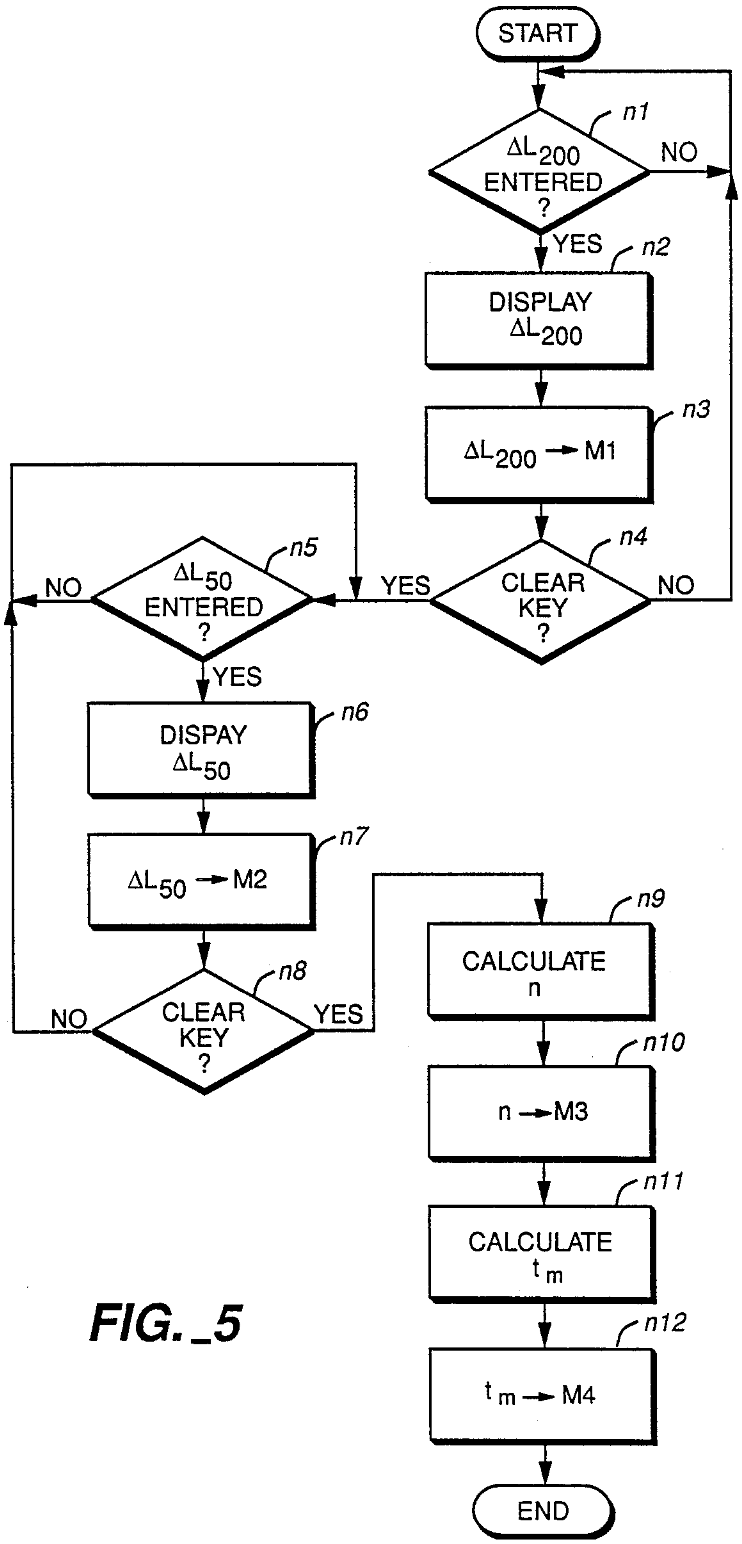
FIG. 5 is a flow chart of the process for setting the timing of supplying a copy paper sheet.

FIG. 5 is a flow chart for the process of setting a timing for the supply of a copy paper sheet according to the motion of the optical scanner 1. This process is also executed during the aforementioned adjustment mode of operation of the copier embodying the present invention. When power is switched on and the control is started in the adjustment mode of operation, the CPU 20 enters an input mode for receiving through the operations of the numerical keys 31 measured values of displacements between the position of a copied image with respect to the copy paper sheet and the position of the target image with respect to the scanned original document. First, the measured value of displacement $\Delta L_{200}$ in the case of $Z=200$ is inputted through the numerical keys 31 (n1) and this value is displayed in the display device 32 (n2) and stored in the memory area (Ml) 22*a* (n3). Next, the operator operates a clear key (n4) to prepare for the next input and the measured value of displacement $\Delta L_{50}$ in the case of $Z=50$ is inputted similarly through the numerical keys 31 (n5). This inputted value is both displayed in the display device 32 (n6) and stored in the memory area (M2) 22*b* (n7). When the operator thereafter operates the clear key (YES in n8), the CPU 20 calculates the pulse number n (n9) and the time period $t_m$ (n11) by using the values $\Delta L_{200}$ and $\Delta L_{50}$ stored in the memory areas 22*a* and 22*b* according to a calculation routine based on aforementioned Equations (3) and (4) preliminarily stored in the ROM 21 and stores these values in the memory areas 22*c* and 22*d*, respectively (n10 and n12). During a subsequent operation of the copier in the normal copying mode, these values of n and tm thus set and stored are read from the memory areas 22*c* and 22*d* and the optical scanner motor 26 and the clutch of the timing rollers 3 are activated accordingly such that copied images can be produced at correct positions with respect to the copy paper sheets according to the relative position of the target image to be copied with respect to the scanned original document.

The foregoing description of a preferred embodiment of the invention has been presented for purposes of illustration and description. It is not intended to be exhaustive or to limit the invention to the precise form disclosed, and many modifications and variations are possible in light of the above teaching. Any such modifications and variations that may be apparent to a person skilled in the art are intended to be included within the scope of this invention.

What is claimed is:

1. A copier comprising
an optical scanner,
paper supplying means for supplying a copy paper sheet to have an image transferred thereonto,
input means for inputting displacement values measured during an adjustment mode of operation of said copier at two magnification values between the position of a target image with respect to a scanned original document and the position of a copied image of said target image with respect to a copy paper sheet,
calculating and storing means for calculating timing values for determining the timing for supplying a copy paper sheet with respect to the action of said optical scanner on the basis of measured values inputted by said input means and storing said calculated timing values, and
driving means for driving said paper supplying means according to a timing based on said timing values stored in said calculating and storing means.

2. The copier of claim 1 wherein said input means include numerical keys disposed on a control panel.

3. The copier of claim 1 wherein said two magnification values are 200% and 50%.

* * * * *